(12) United States Patent
Lalo et al.

(10) Patent No.: US 10,902,309 B2
(45) Date of Patent: Jan. 26, 2021

(54) SYSTEM AND METHOD FOR MANUFACTURING AND ASSEMBLING PACKAGED ELECTRONIC MODULES

(71) Applicants: Cyril Lalo, Los Angeles, CA (US); Sebastien Pochic, Schaerbeek (BE); Jacques Essebag, Paris (FR)

(72) Inventors: Cyril Lalo, Los Angeles, CA (US); Sebastien Pochic, Schaerbeek (BE); Jacques Essebag, Paris (FR)

( * ) Notice: Subject to any disclaimer, the term of this patent is extended or adjusted under 35 U.S.C. 154(b) by 0 days.

(21) Appl. No.: 16/745,186

(22) Filed: Jan. 16, 2020

(65) Prior Publication Data

US 2020/0167624 A1 May 28, 2020

Related U.S. Application Data

(63) Continuation-in-part of application No. 16/299,037, filed on Mar. 11, 2019, now Pat. No. 10,592,795, which is a continuation-in-part of application No. 15/645,234, filed on Jul. 10, 2017, now Pat. No. 10,268,942.

(51) Int. Cl.
*G06K 19/077* (2006.01)

(52) U.S. Cl.
CPC ... *G06K 19/0772* (2013.01); *G06K 19/07773* (2013.01)

(58) Field of Classification Search
None
See application file for complete search history.

(56) References Cited

U.S. PATENT DOCUMENTS

| 2015/0129665 A1* | 5/2015 | Finn | B23K 26/40 |
|---|---|---|---|
| | | | 235/492 |
| 2017/0132507 A1* | 5/2017 | Blythe | B42D 25/305 |

* cited by examiner

*Primary Examiner* — Kristy A Haupt
(74) *Attorney, Agent, or Firm* — Cohen IP Law Group, PC; Michael N. Cohen

(57) ABSTRACT

A system and method of manufacturing and/or assembling packaged electronic modules for use with smart cards is disclosed. The packaged electronic modules may include contact plate(s), printed circuit(s) and/or value add components such as displays.

20 Claims, 14 Drawing Sheets

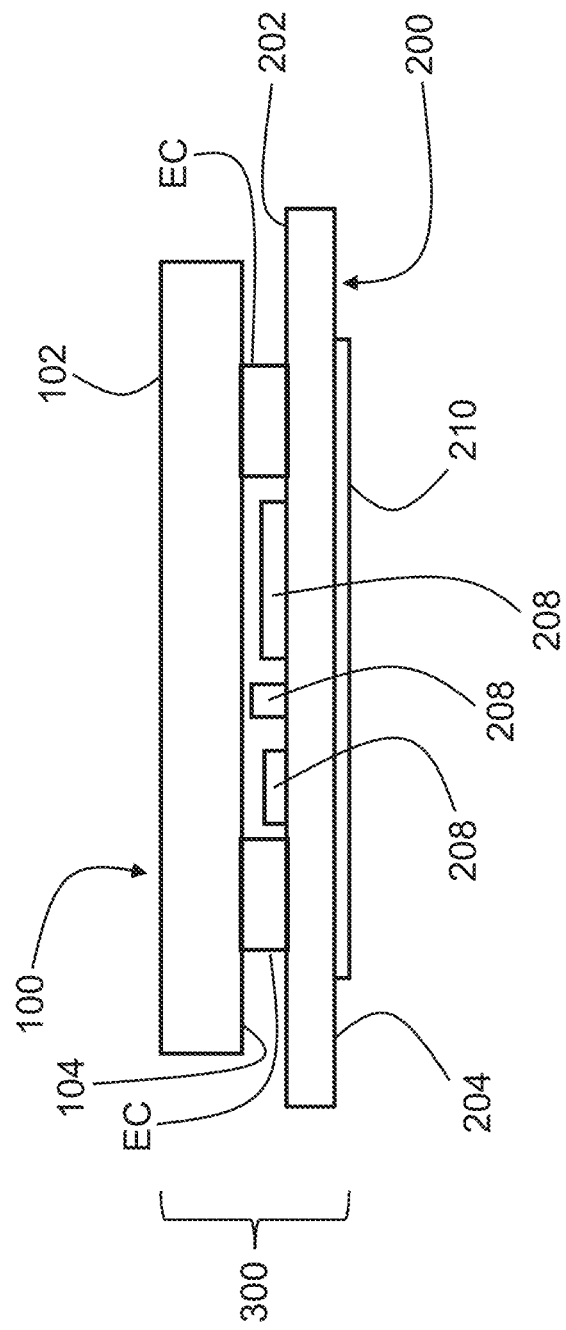

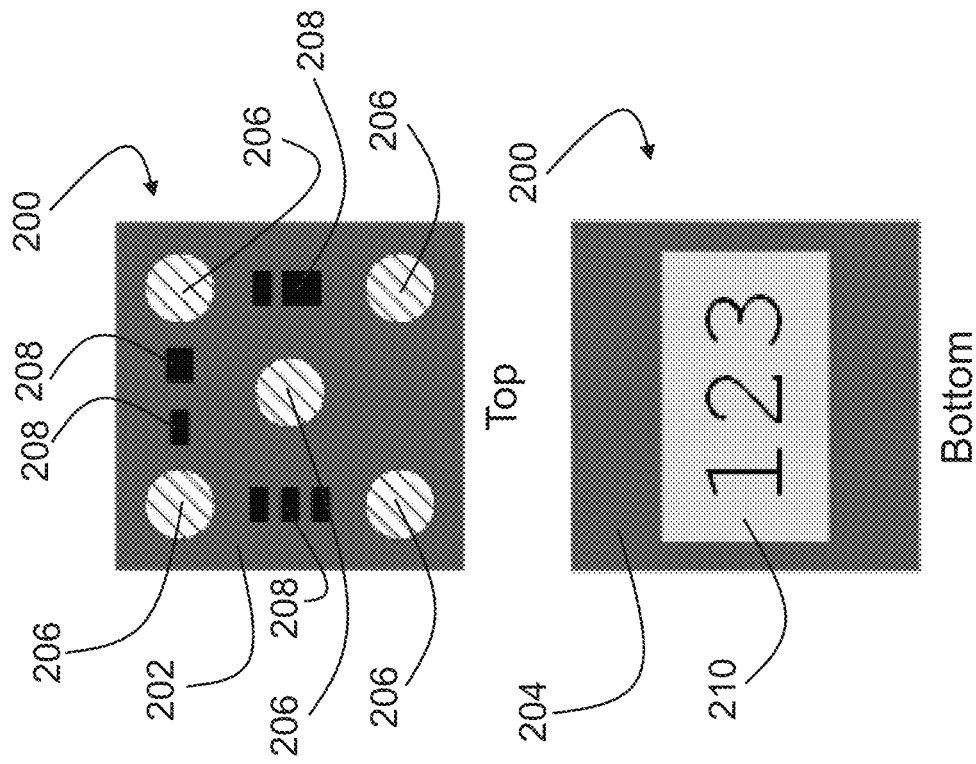
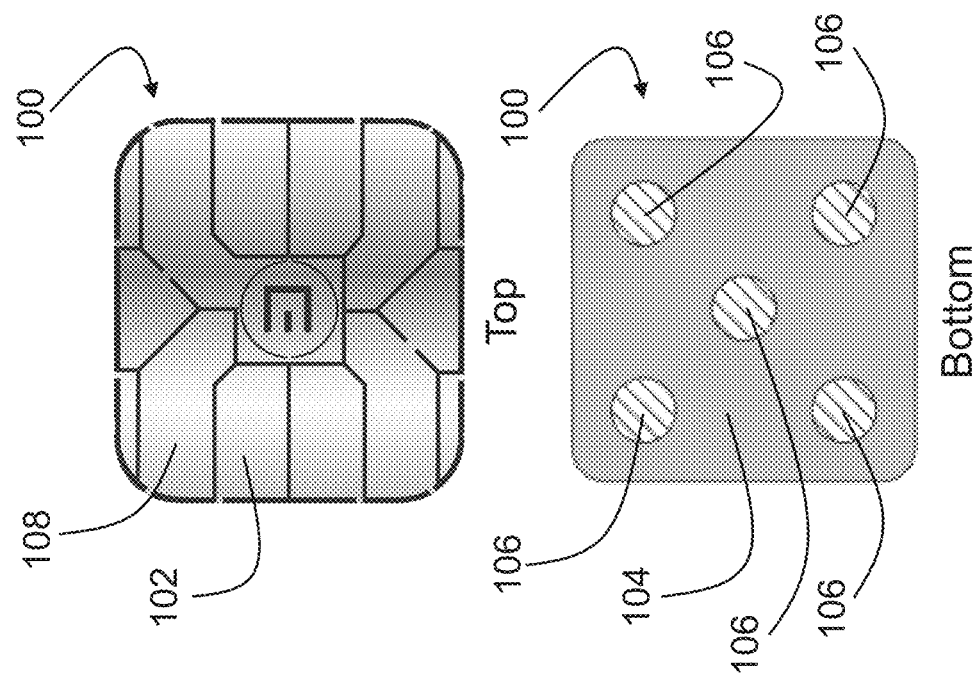

SYSTEM AND METHOD FOR MANUFACTURING AND ASSEMBLING PACKAGED ELECTRONIC MODULES

CROSS REFERENCE TO RELATED APPLICATIONS

This application is a continuation-in-part of U.S. patent application Ser. No. 16/299,037 which is a continuation-in-part of U.S. patent application Ser. No. 15/645,234, now U.S. Pat. No. 10,268,942, all of which are fully incorporated herein by reference for all purposes.

COPYRIGHT STATEMENT

This patent document contains material subject to copyright protection. The copyright owner has no objection to the reproduction of this patent document or any related materials in the files of the United States Patent and Trademark Office, but otherwise reserves all copyrights whatsoever.

FIELD OF THE INVENTION

This invention relates to electronic modules, including systems and methods for the manufacturing and/or assembly of electronic modules for use in smart cards.

BACKGROUND

Smart cards, chip cards or integrated circuit cards (ICCs) typically include a credit card-sized card with an embedded integrated circuit (IC) chip and other elements. Smart cards are commonly used to control access to resources such as a bank or credit card account for financial transactions, to provide personal identification, authentication, data storage, application processing and for other purposes.

Many smart cards include a pattern of metal contacts (e.g., a contact plate) to provide electrical connectivity (e.g., via a card reader) to the internal chip.

Current processes of manufacturing and/or assembling the chips, the contact plate and other elements within the card require a large number of steps, and as a result, are time consuming, expensive and prone to problems.

Accordingly, there is a need for a process of manufacturing and/or assembling packaged electronic modules for use within smarts cards that reduces the number of steps, the time required for the process, the expense of the process and the problems that may occur.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein:

FIG. 1 shows aspects of a packaged electronic module according to exemplary embodiments hereof;

FIG. 2A shows aspects of a contact plate according to exemplary embodiments hereof;

FIG. 2B shows aspects of a printed circuit according to exemplary embodiments hereof;

DETAILED DESCRIPTION OF EXEMPLARY EMBODIMENTS

Figure 3:
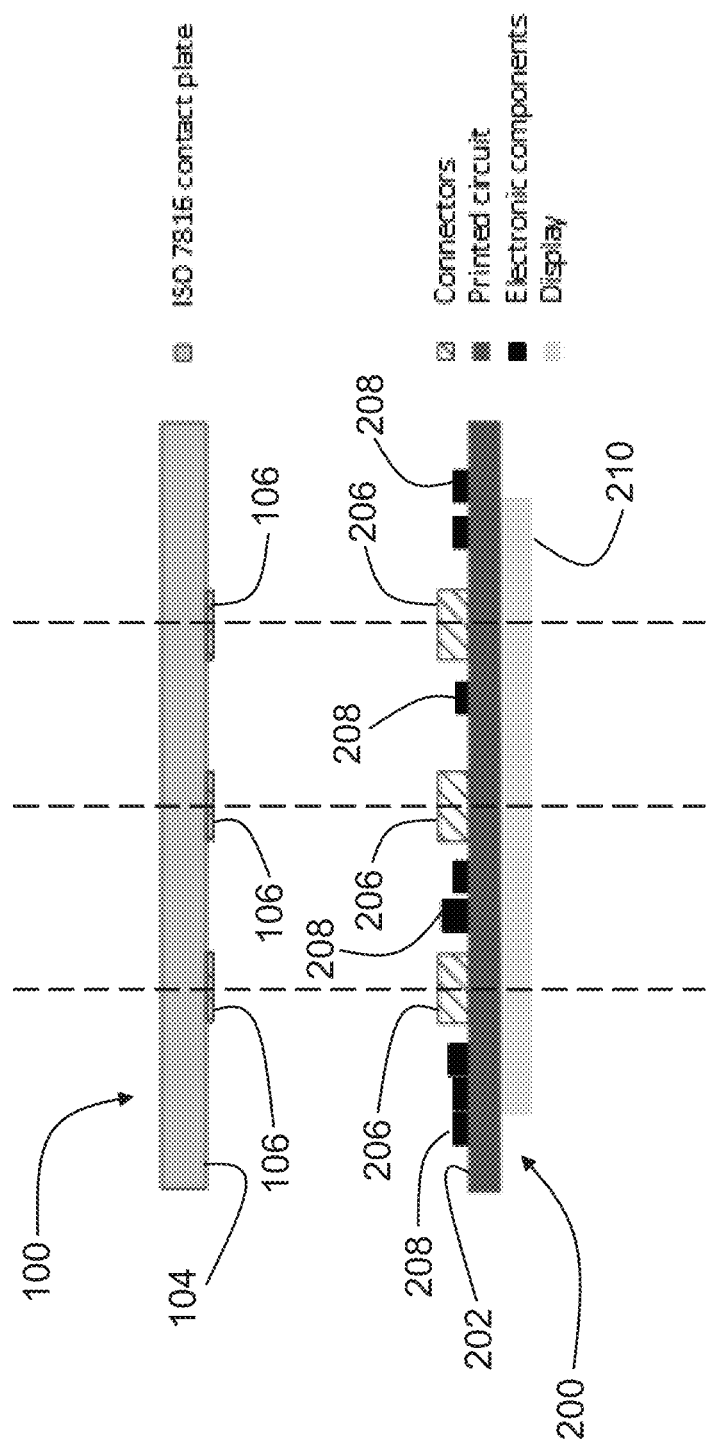
FIGS. 3-9 show aspects of a packaged electronic module according to exemplary embodiments hereof.

In general, and according to exemplary embodiments hereof, the invention includes systems and methods of manufacturing and/or assembling packaged electronic modules that may then be integrated into value-add smart cards (e.g., value-add credit cards, value-add debit cards, etc.).

In some embodiments, the system and method require only the use of standardized equipment and/or machinery thereby minimizing the need to develop or purchase new equipment.

In addition, the system and method may use standardized parts (e.g., ISO 7816 contact plates) and procedures such that existing certifications and/or quality labels may be leveraged for the end products (e.g., Mastercard CQM labels for ICM). Note however that other parts that may be standardized and/or non-standardized may also be used.

Accordingly, the invention provides a system and method for the manufacturing and/or assembly of all-in-one packaged electronic modules that is practical, cost-effective and scalable for industrial production.

Referring now to FIGS. 1-14, the invention according to exemplary embodiments hereof will be described in further detail. It is understood that the elements illustrated in the FIGS. 1-14 may or may not be to scale or shown in actual proportion with respect to one another.

FIG. 1 depicts a general representation of a contact plate 100 electrically configured with a printed circuit 200 to form a packaged electronic module 300. The contact plate 100 includes a top 102 and a bottom 104, and the printed circuit 200 includes a top 202 and a bottom 204. In some embodiments, the printed circuit 200 includes electronic components 208 and a value-add component 210. In some embodiments, the value-add component 210 may include a display, a fingerprint sensor, an LED device, any other type of value-add component and any combination thereof.

In some embodiments, the contact plate 100 and the printed circuit 200 are electrically connected by electrical connectors EC. It is understood that FIG. 1 is meant for demonstration and that it does not represent the number, architecture or location of the electrical connectors EC, nor does the figure represent the relative sizes and shapes of the contract plate 100, the printed circuit 200 or the electrical connectors EC. In some embodiments, the electrical connectors EC include electrical elements configured with the contact plate 100, electrical elements configured with the printed circuit 200 and/or any combination thereof.

Two-Part Assembly #1

FIG. 2A shows the top 102 and bottom 104 of the contact plate 100. In one exemplary embodiment hereof, the contact plate 100 includes one or more electrical connectors 106 on one surface (e.g., on the bottom 104 of the contact plate 100) and one or more corresponding electrical contact points 108 on an opposite surface (e.g., on the top 102 of the contact plate 100). Each electrical connector 106 is preferably electrically tied to one or more associated contact points 108 according to the pinout of the packaged electronic module 300.

Other types of components such as electrical components 208, one or more antennas and/or other devices also may be configured on the underside 104 of the contact plate 100. In some embodiments, corresponding areas on the printed circuit 200 may be readied to receive the electrical components 208 upon the electrical mating of the contact plate 100 and the printed circuit 200. In other embodiments, devices configured on the underside 104 of the contact plate 100 may fit within the gap formed between the contact plate 100 and the printed circuit 200 when the plate 100 and circuit 200 are mated. This will be described in other sections.

In one implementation as shown, the contact plate 100 includes five electrical connectors 106. In other embodiments, the contact plate 100 may include other numbers of electrical connectors 106. For example, if the contact plate 100 includes an antenna or other element on its underside, the contact plate 100 may include seven electrical connectors 106 (two additional electrical connectors 106 for the antenna). Any other number of electrical connectors 106 may also be used.

In some embodiments, the contact plate 100 conforms to the specifications of an ISO 7816 contact plate. It is understood however that other types of contact plates 100 conforming to other standards may also be used and that the scope of the system 10 is not limited in any way by the type of contact plate 100 that may be used.

In some embodiments, the electrical connectors 106 are formed with the contact plate 100 during the manufacturing process of the contact plate 100. In other embodiments, the electrical connectors 106 are attached to the contact plate 100 using surface-mount technology (SMT), using electrically conductive adhesive bonds with anisotropic conductive adhesive/film (ACF bonding), soldering, wire bonding, using other attachment techniques or any combination thereof.

FIG. 2B shows the top 202 and bottom 204 of the printed circuit 200. In one exemplary embodiment hereof, the printed circuit 202 includes one or more electrical connectors 206 on one surface (e.g., on the top 202 of the printed circuit 202) that lead to associated electrical components 208 configured with the printed circuit 200 according to the pinout of the packaged electronic module 300. In one implementation as shown, the printed circuit 200 includes five electrical connectors 206. It is understood however that the printed circuit 200 may include any number of electrical connectors 206.

In some embodiments, the electrical connectors 206 are formed with the printed circuit 200 during the manufacturing process of the printed circuit 200. In other embodiments, the electrical connectors 206 are attached to the printed circuit 200 using surface-mount technology (SMT), using electrically conductive adhesive bonds with anisotropic conductive adhesive/film (ACF bonding), soldering, wire bonding, using other attachment techniques or any combination thereof.

In one exemplary embodiment hereof as shown in FIG. 3, with the contact plate 100 in planar alignment above the printed circuit 200, and with the contact plate's electrical connectors 106 facing the printed circuit's electrical connectors 206, the one or more electrical connectors 106 on the contact plate 100 are in alignment with at least one of the one or more electrical connectors 206 on the printed circuit 200. In a preferred implementation, the one or more electrical connectors 106 on the contact plate 100 are in alignment with each corresponding electrical connectors 206 on the printed circuit 200. For example, in a preferable implementation, the contact plate's five electrical connectors 106 (best seen in FIG. 2A) are in alignment with the printed circuit's corresponding five electrical connectors 206 (best seen in FIG. 2B).

Figure 4:
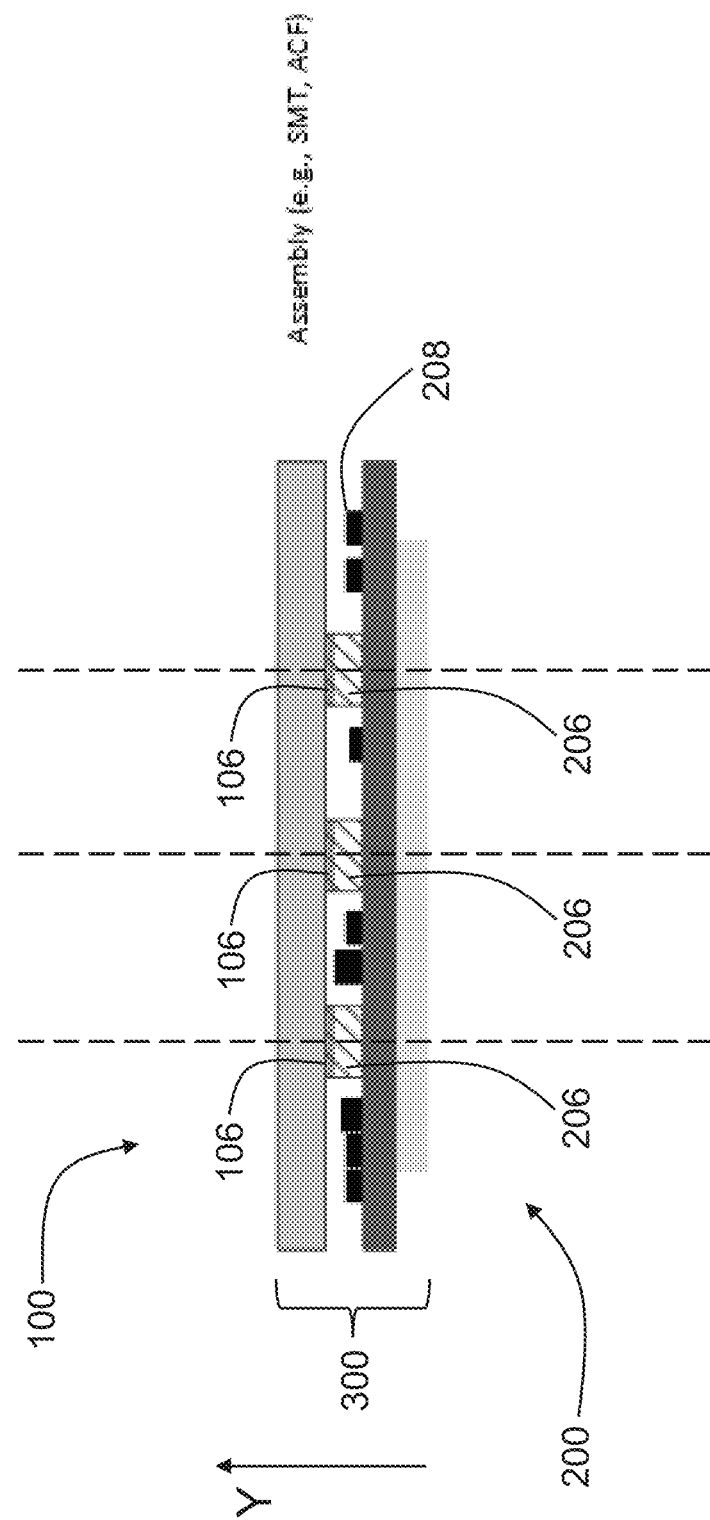

As shown in FIG. 4, while in planar alignment, the contact plate 100 and the printed circuit 200 are joined such that the desired electrical connectors 106 on the contact plate 100 are electrically mated to the corresponding electrical connectors 206 on the printed circuit 200. This assembles the contact plate 100 with the printed circuit 200 to form the packaged electronic module 300. Conductive grease (electrical paste) may be used to mate the electrical connectors 106, 206 respectively, to reduce contact resistance, repel moisture, inhibit corrosion and prevents static buildup. Other mating techniques may also be used.

In one exemplary embodiment hereof, the electronic components 208 are not damaged or compromised in any way by the mating of the contact plate 100 with the printed circuit 200. In one embodiment, the height of the electronic components 208 (along the Y-axis of FIG. 4), is less than the height of the gap between the contact plate 100 and the printed circuit 200 formed by the mating of the plate 100 and the circuit 200. In one embodiment, the height of the combined electrical connectors 106 and 206 forms a gap between the plate 100 and the circuit 200 that safely accommodates the electronic components 208.

Figure 5:
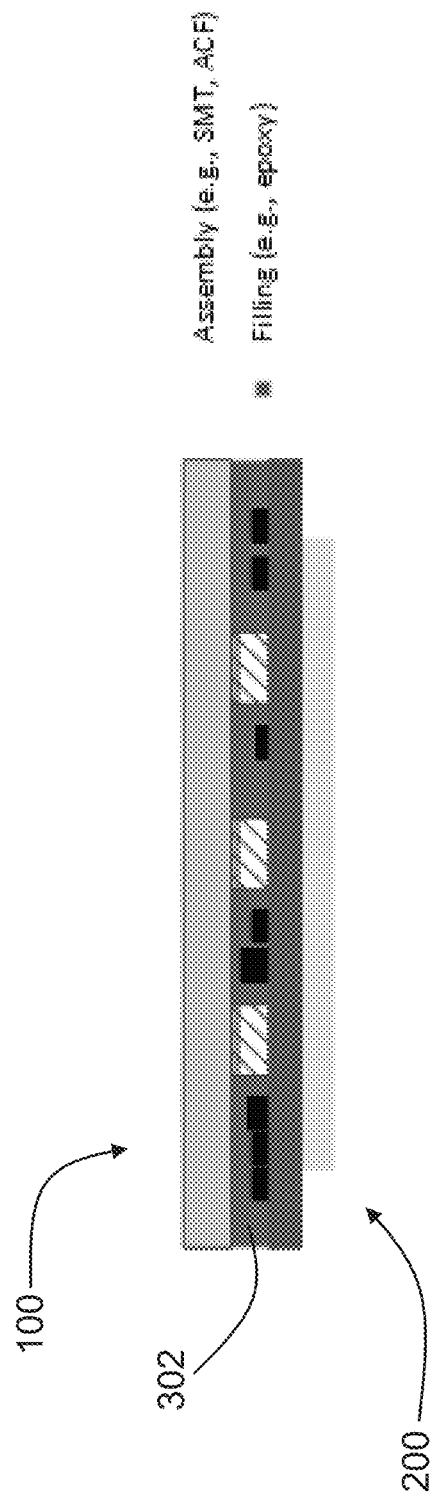

In one embodiment as shown in FIG. 5, the cavity formed between the contact plate 100 and the printed circuit 200 in the assembled packaged electronic module 300 may be potted with a thermoplastic 302, polyurethane, silicon rubber gel or other suitable potting material. This may bond the contact plate 100 with the printed circuit 200, help prevent damage to the module 300 from shock and vibration and exclude moister and/or corrosive elements.

Two-Part Assembly #2

Figure 6:
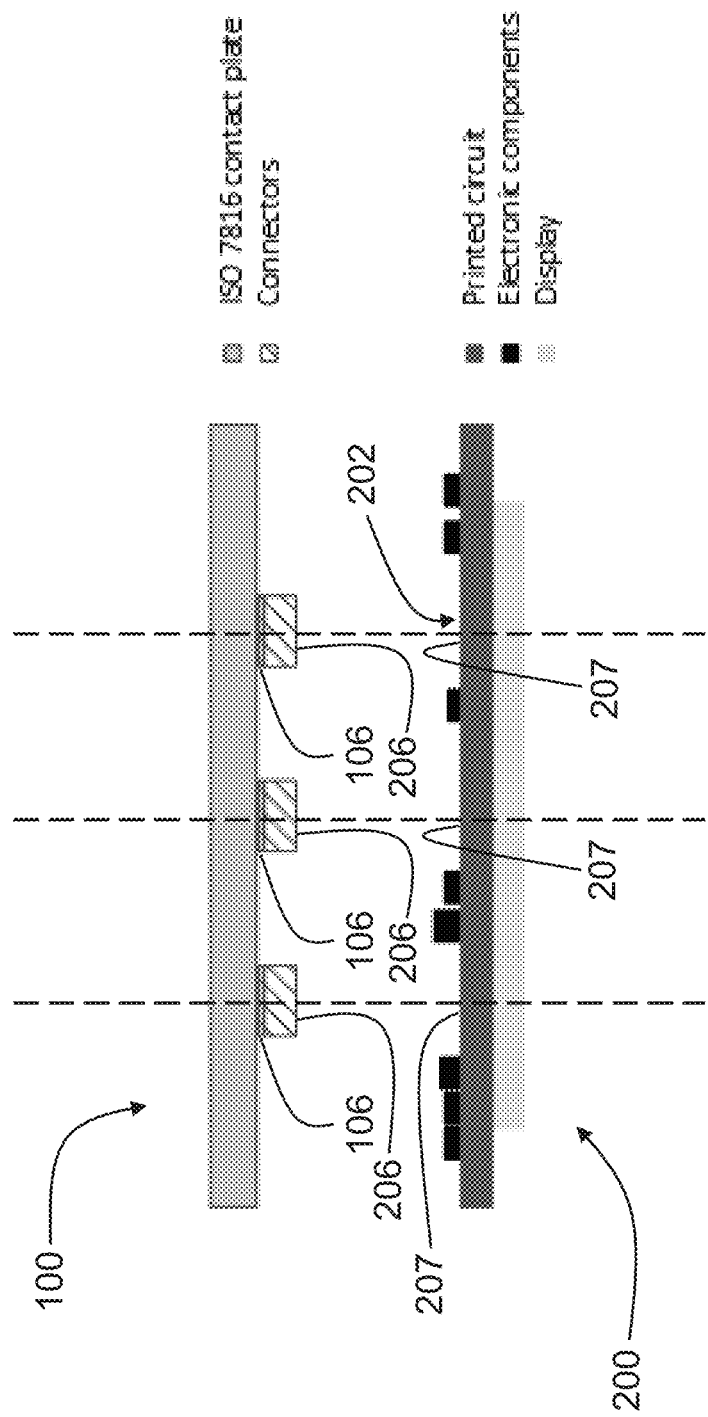

In one exemplary embodiment as shown in FIG. 6, the printed circuit's electrical connectors 206 are mated with their corresponding electrical connectors 106 on the contact plate 100 prior to being configured with the printed circuit 200. In this way, the printed circuit's electrical connectors 206 may act as extensions to the contact plate's electrical connectors 106. In this implementation, corresponding areas 207 on the printed circuit 200 (e.g., on the top 202 of the printed circuit 200) are adapted to receive the electrical connectors 206. The corresponding areas 207 are preferably free of obstructions and are readied for receiving the electrical connectors 206 upon the electrical mating of the contact plate 100 and the printed circuit 200. The corresponding areas 207 may include electrical contacts that electrically mate with the electrical connectors 206 to electrically tie the electrical connectors 206 to electrical components 208 and other elements.

In one embodiment, the combined electrical connectors 106 and 206 may be replaced by a single electrical connector 106 that may include a length generally equivalent to the length of the combined electrical connectors 106, 206. In this way, the single (longer) electrical connector 106 may provide the same or similar result as the combined electrical connectors 106, 206 by extending from the underside 104 of the contact plate 100 to the corresponding areas 207 on the printed circuit 200 (e.g., on the top 202 of the printed circuit 200).

Other types of components such as electrical components 208, one or more antennas and/or other devices also may be configured on the underside 104 of the contact plate 100. In some embodiments, corresponding areas on the printed circuit 200 may be readied to receive the electrical components 208 upon the electrical mating of the contact plate 100 and the printed circuit 200. In other embodiments, devices configured on the underside 104 of the contact plate 100 may fit within the gap formed between the contact plate 100 and the printed circuit 200 when the plate 100 and circuit 200 are mated. This will be described in other sections.

As illustrated in FIG. 6, with the contact plate 100 in planar alignment above the printed circuit 200, and with the contact plate's electrical connectors 106 configured with the printed circuit's electrical connectors 206 facing the surface on the printed circuit 200, the one or more combined electrical connectors 106, 206 on the contact plate 100 are preferably in alignment with at least some of the corresponding areas 207 on the printed circuit 200 readied to receive the printed circuit's electrical connectors 206. In a preferred implementation, the one or more combined electrical connectors 106, 206 on the contact plate 100 are in alignment with each corresponding area 207 on the printed circuit 200 readied to receive the electrical connectors 206. For example, in a preferable implementation, the five combined electrical connectors 106, 206 on the contact plate 100 (e.g., in the pattern as seen in FIG. 2A) are in alignment with the printed circuit's corresponding five areas 207 readied to receive the printed circuit's electrical connectors 206 (in the pattern as seen in FIG. 2B).

Figure 7:
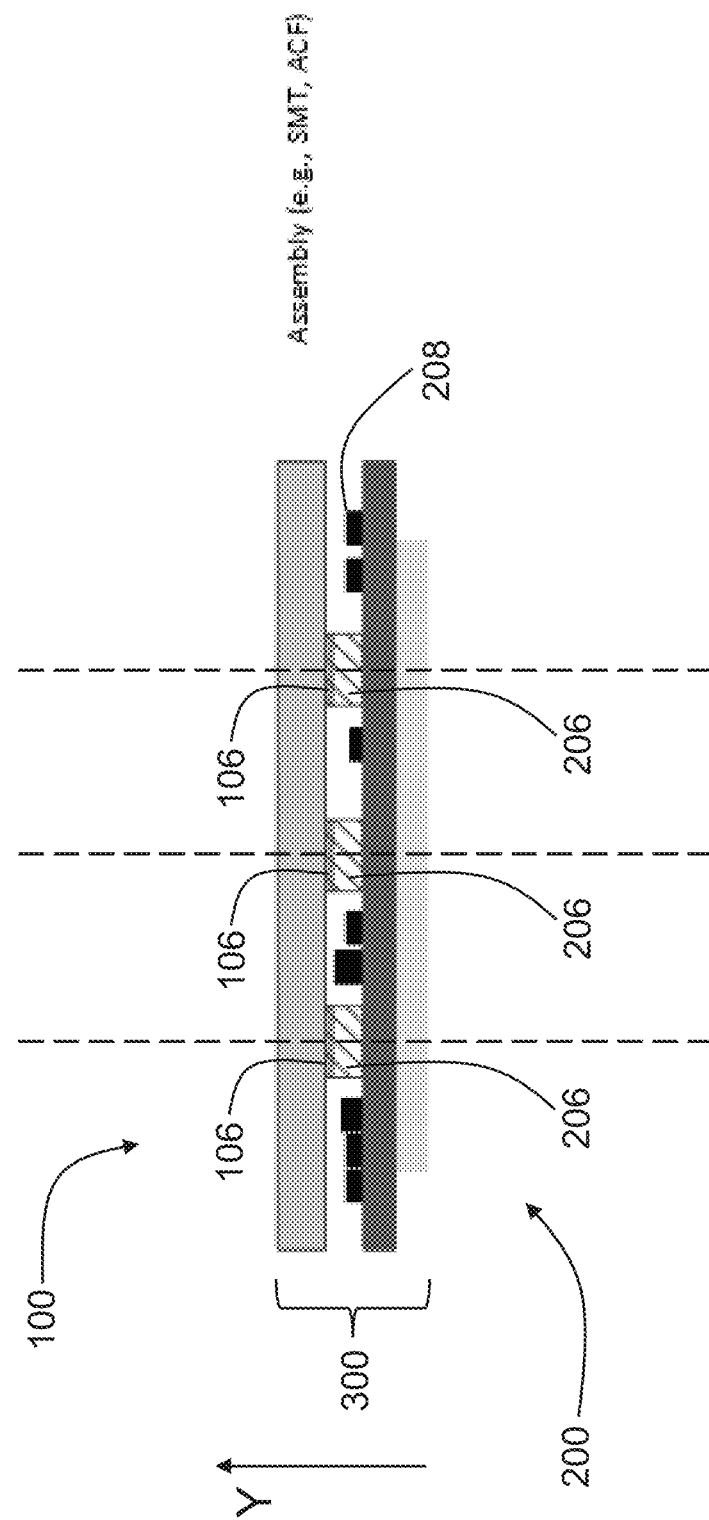

As shown in FIG. 7, while in planar alignment, the contact plate 100 and the printed circuit 200 are joined and the desired combined electrical connectors 106, 206 on the contact plate 100 are electrically mated to the corresponding areas 207 on the printed circuit 200 readied to receive the electrical connectors 206. This assembles the contact plate 100 with the printed circuit 200 to form the packaged electronic module 300.

In some embodiments, the electrical connectors 206 are attached to the corresponding areas 207 on the printed circuit 200 ready to receive the connectors 206 using surface-mount technology (SMT), electrically conductive adhesive bonds with anisotropic conductive adhesive/film (ACF bonding), soldering, wire bonding, other attachment techniques or any combination thereof.

As with the other embodiments, the electronic components 208 are not damaged or compromised in any way by the mating of the contact plate 100 with the printed circuit 200. In one embodiment, the height of the electronic components 208 (along the Y-axis of FIG. 7), is less than the height of the gap between the contact plate 100 and the printed circuit 200 formed by the mating of the plate 100 and the circuit 200. In one embodiment, the height of the combined electrical connectors 106 and 206 forms a gap between the plate 100 and the circuit 200 that safely accommodates the electronic components 208.

As with the other embodiments, the cavity formed between the contact plate 100 and the printed circuit 200 in the assembled packaged electronic module 300 may be potted with a thermoplastic, polyurethane, silicon rubber gel or other suitable potting material. This may bond the contact plate 100 with the printed circuit 200, help prevent damage to the module 300 from shock and vibration and exclude moister and/or corrosive elements.

N-Part Assembly

Figure 8:
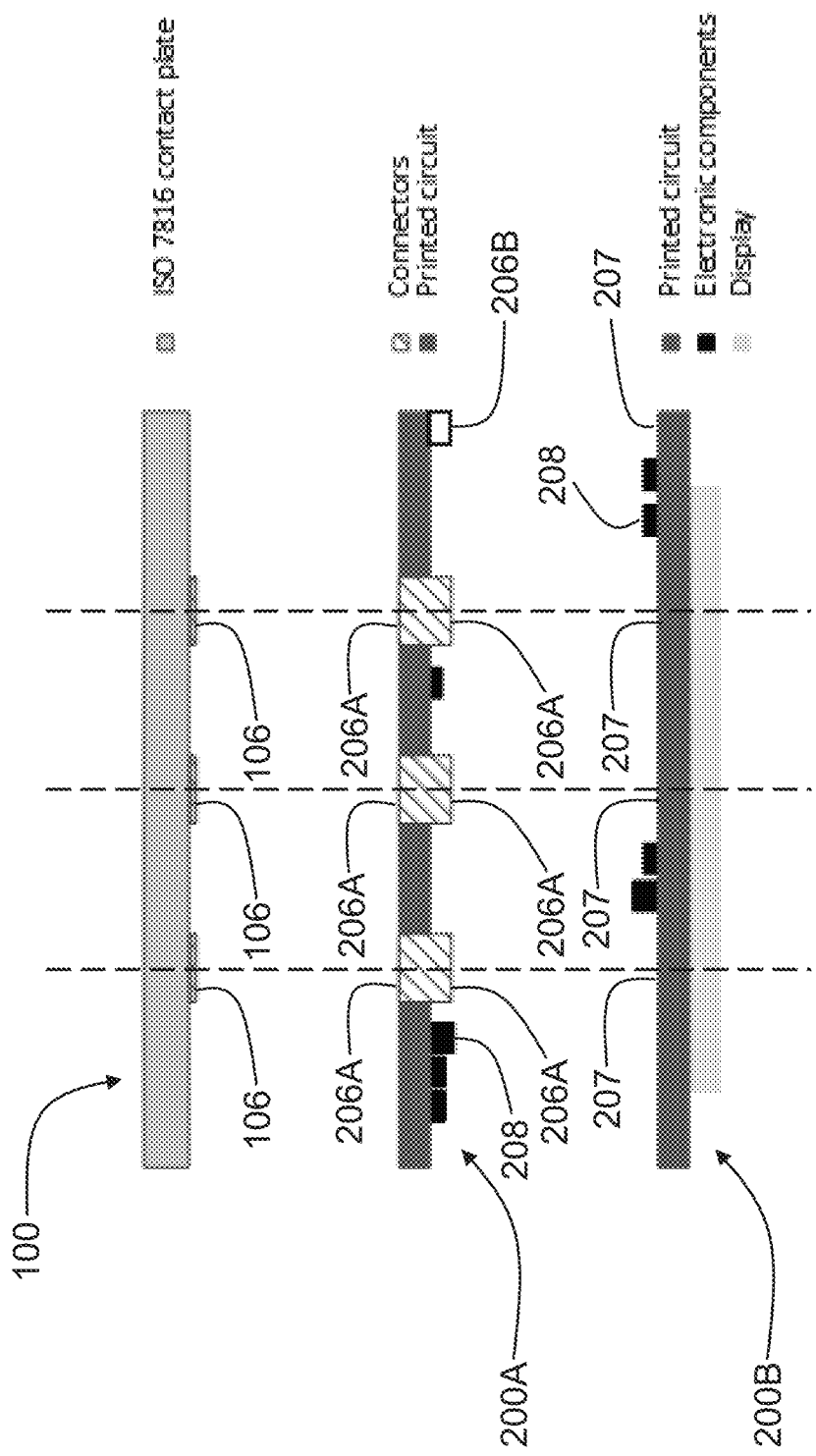
Figure 9:
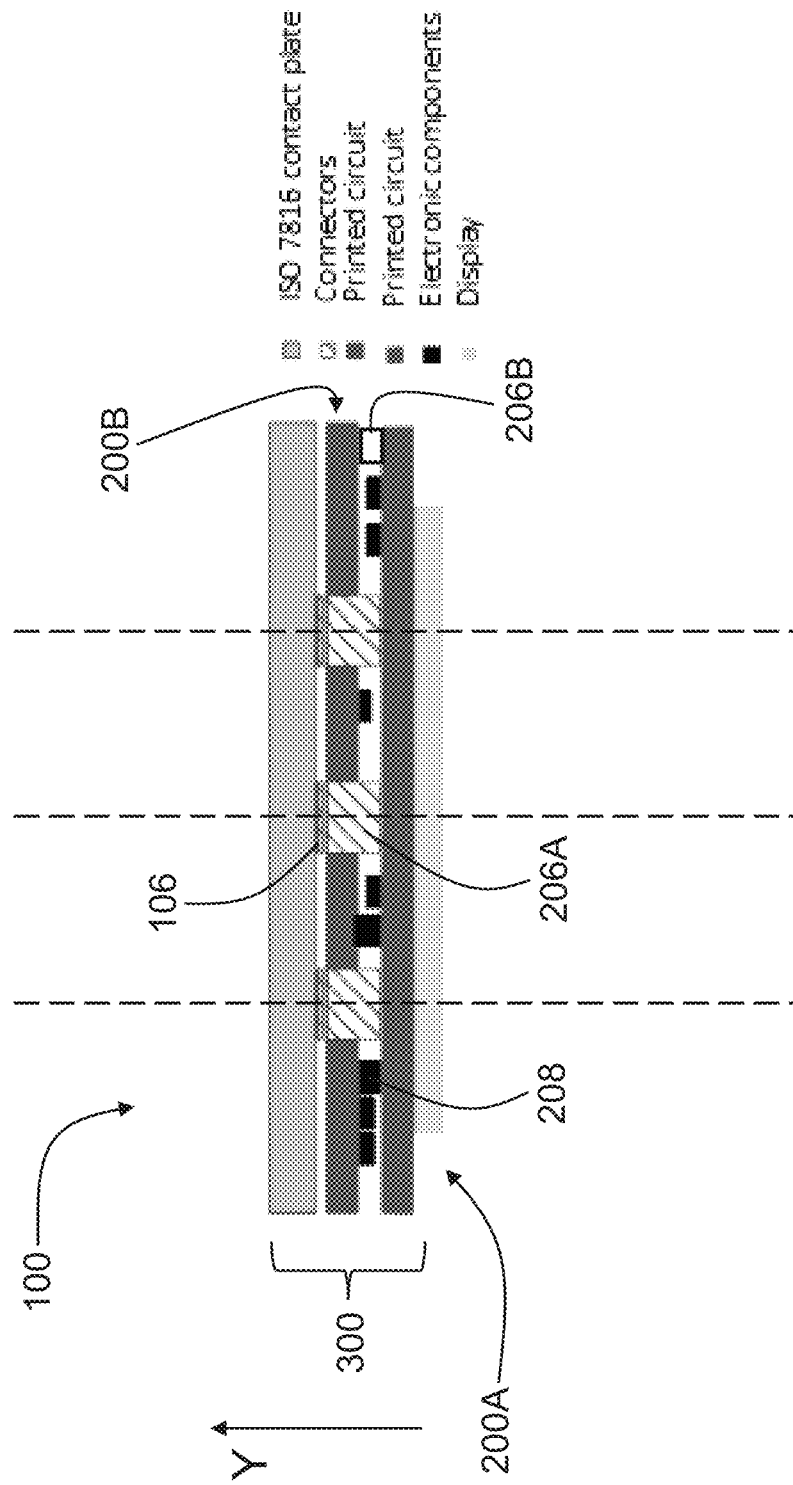

In one exemplary embodiment as shown in FIG. 8, packaged electronic module 300 may include two or more printed circuits 200A, 200B, . . . 200N that when combined form the overall printed circuit 200, and a contact plate 100. For example, the mating of the contact plate 100 with printed circuit 200A and printed circuit 200B of FIG. 8 may form the packaged electronic module 300 of FIG. 9. While FIG. 8 depicts electronic components 208 generally configured on the bottom surface of printed circuit 200A and on the top surface of printed circuit 200B, it is understood that electrical components 208 also may be configured on the upper surface of printed circuit 200A, on the lower surface of printed circuit 200B and/or on any other surface of printed circuit 200A and/or on any surface of printed circuit 200B.

In one embodiment, the printed circuit 200 configured directly beneath the contact plate 200 (e.g., printed circuit 200A) includes electrical connectors 206A that are aligned with at least some of the contact plate's electrical connectors 106. In this way, when the contact plate 100 is configured with the printed circuit 200A, the circuit board's electrical connectors 206A may electrically mate with the aligned electrical connectors 106 on the contact plate 200.

In some embodiments, at least some of the electrical connectors 206A on the top of the printed circuit 200A pass through the printed circuit 200A and are accessible to the lower printed circuit board 200 (e.g., 200B). In some embodiments, the top of the lower printed circuit 200B includes corresponding areas 207 adapted to receive the electrical connectors 206A that pass through the printed circuit 200A. The corresponding areas 207 are preferably free of obstructions and are readied for receiving the electrical connectors 206A upon the electrical mating of the upper printed circuit 200A and the lower printed circuit 200B. The corresponding areas 207 may include electrical contacts that electrically mate with the electrical connectors 206A to electrically tie the electrical connectors 206A to electrical components 208 and other elements.

In some embodiments, the upper printed circuit 200A includes electrical connectors 206B that do not pass through the printed circuit 200A but that are configured with the lower surface of the printed circuit 200A and that are adapted to mate with corresponding areas 207 on the lower printed circuit 200B when the printed circuits 200A and 200B are electrically mated. The corresponding areas 207 may include electrical contacts that electrically mate with the electrical connectors 206B to electrically tie the electrical connectors 206B to electrical components 208 and other elements.

It is understood that the electrical connectors 200A and 200B may be adapted to electrically connect one or more electrical components 208 (configured with printed circuits 200A and/or 200B) with the contact plate 100.

As with the other embodiments, the electronic components 208 (included on printed circuit 200A and/or 200B) are not damaged or compromised in any way by the mating of the printed circuits 200A and 200B to form the printed circuit 200, or by the mating of the printed circuits 200, 200A and/or 200B with the contact plate 100. In one embodiment, the height of the electronic components 208 (along the Y-axis of FIG. 9), is less than the height of the gap in which the components 208 may reside. For example, the height of the electronic components 208 configured within the gap between the printed circuit 200A and printed circuit 200B may be less than the gap between the printed circuits 200A and 200B. In one embodiment, the height of the electrical connectors 206 between the circuits 200A and 200B forms a gap between the circuits 200A, 200B that safely accommodates the electronic components 208.

In another example, the height of any electronic components 208 configured within the gap between the printed circuit 200A and the contact plate 100 may be less than the gap between the printed circuit 200A and the contact plate 100. In one embodiment, the height of the combined electrical connectors 106 (on the lower surface of the contact plate 100 and electrical connectors 206 (on the upper surface of the printed circuit 200A) forms a gap between the plate 100 and the circuit 200A that safely accommodates the electronic components 208.

As with the other embodiments, the cavity formed between the contact plate 100 and the printed circuit 200A and the cavity formed between circuits 200A and 200B in the assembled packaged electronic module 300 may be potted with a thermoplastic, polyurethane, silicon rubber gel or other suitable potting material. This may bond the contact plate 100 with the printed circuit 200A and the printed circuit 200A with printed circuit 200B, help prevent damage to the module 300 from shock and vibration and exclude moister and/or corrosive elements.

It is understood that while the example described above with respect to FIGS. 8 and 9 depicts two printed circuits 200A and 200B configured with a contact plate 100 to form the packaged electronic module 300, any number of printed circuits 200N may be combined with the contact plate 100 to form the packaged electronic module 300. It is also understood that the details described above with respect to printed circuits 200A and 200B also may pertain to any other printed circuits 200N that may be configured with the printed circuits 200A and 200B to form an overall printed circuit 200 and/or the packaged electronic module 300. It is also understood that the scope of the system 10 is not limited in any way by the number of printed circuits 200N that may be configured with a contact plate 100 to form a packaged electronic module 300.

Forming the Contact Plates and/or the Printed Circuits

In one exemplary embodiment hereof, the contact plate 100 and the printed circuit 200 (whether a single printed circuit 200 or a printed circuit 200 comprising two or more printed circuits 200N) are each formed individually and then combined as described above to form a packaged electronic module 300.

Figure 10:
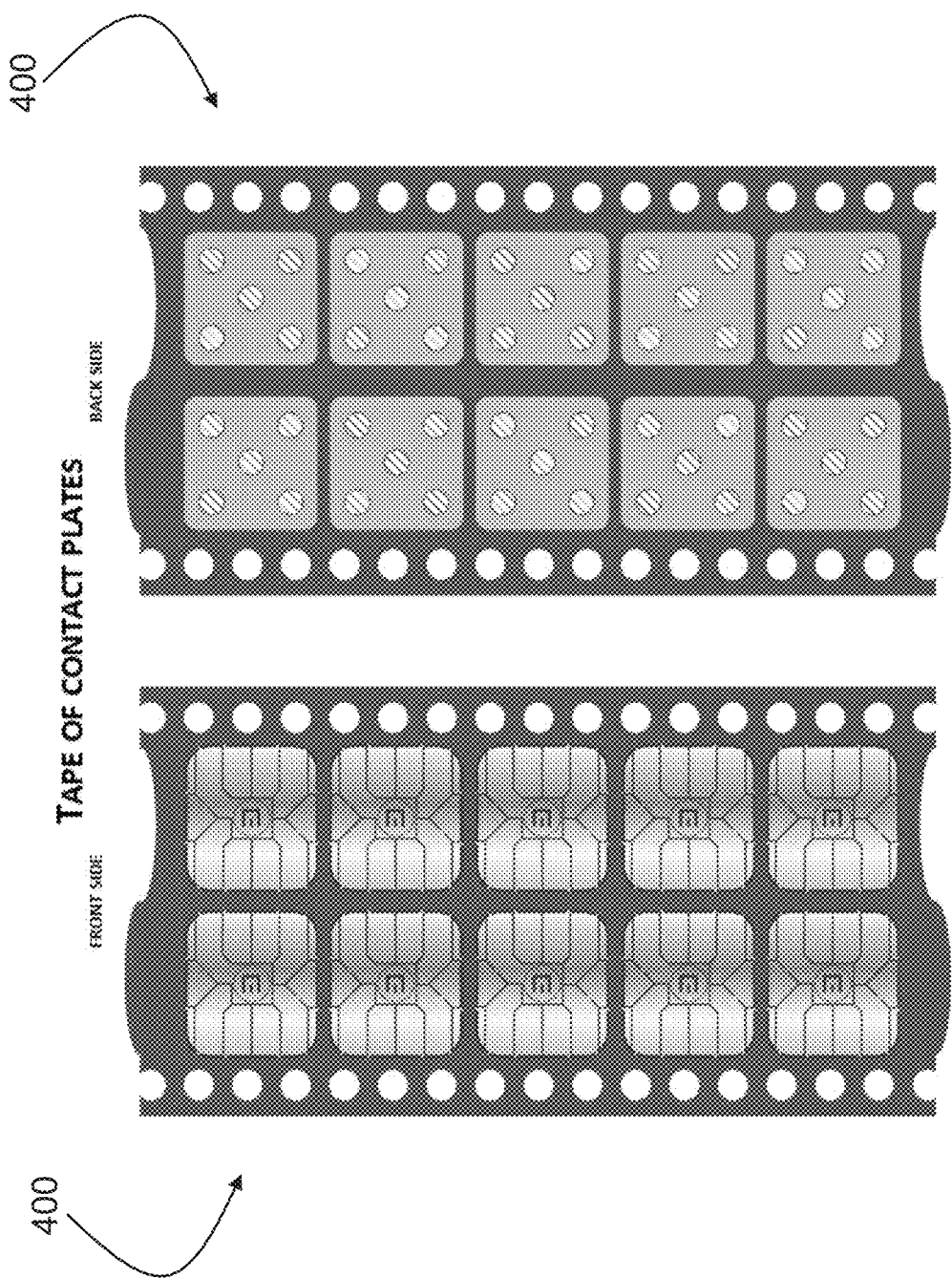
FIG. 10 shows aspects of a contact plate tape according to exemplary embodiments hereof.

In one exemplary embodiment hereof as shown in FIG. 10, each contact plate 100 is formed as part of a tape 400 that contains a plurality of parts. In some embodiments, the plurality of parts may be identical (e.g., identical contact plates 100), while in other embodiments the parts may be different or any combination thereof.

Figure 11:
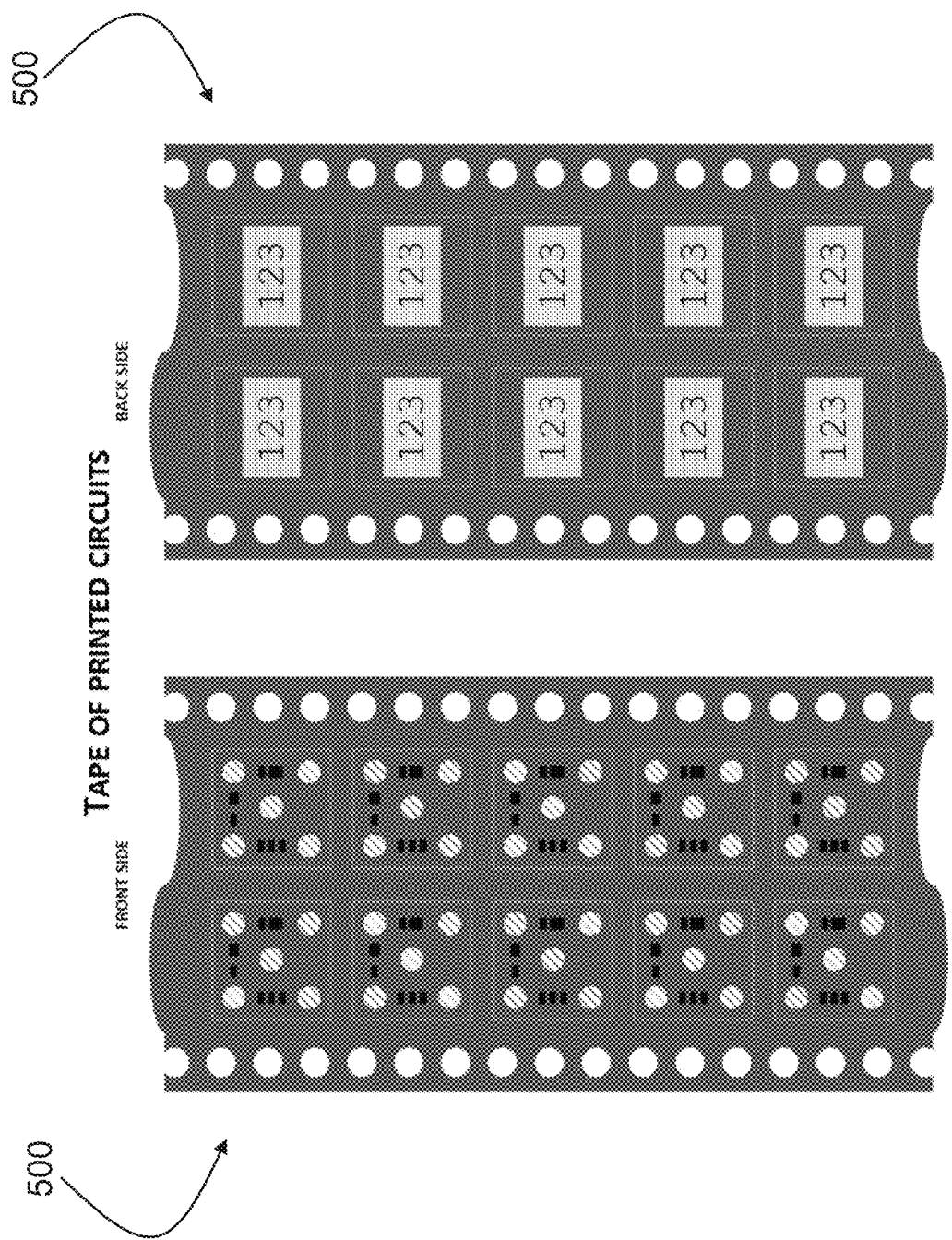
FIG. 11 shows aspects of a printed circuit tape according to exemplary embodiments hereof.

In one exemplary embodiment hereof as shown in FIG. 11, each printed circuit 200 is formed as part of a tape 500 that contains a plurality of parts. In some embodiments, the plurality of parts may be identical (e.g., identical printed circuits 200), while in other embodiments the parts may be different or any combination thereof.

While FIG. 10 illustrates a tape 400 including two side-by-side rows of contact plates 100, and FIG. 11 illustrates a tape 500 including two side-by-side rows of printed circuits 200, it is understood that the tape 400 may include any number of contact plates 100 in any formation, and that the tape 500 may include any number of printed circuits 200 in any formation. It may be preferable that the number and formation of contact plates 100 included in the tape 400 generally match the number and formation of printed circuits 200 included in the tape 500, but this may not be necessary.

In one exemplary embodiment hereof, the tape 400 of contact plates 100 may be diced to extract each individual contact plate 100 from the tape 400. In one exemplary embodiment hereof, the tape 500 of printed circuits 200 may be diced to extract each individual printed circuit 200 from the tape 500. In some embodiments, the tapes 400, 500 may each include weakened die cut lines defining the perimeter of the contact plate 100 and the printed circuit 200, respectively, that may facilitate breaking of the tapes 400, 500 along the weakened die cut lines to extract each component 100, 200. In other embodiments, a die cut tool or any other type of tool or process may be used to extract the individual components from the tapes 400 and 500.

Once the contact plates 100 and the printed circuits 200 are extracted from the tapes 400, 500 respectively, the plates 100 and the circuits 200 may be configured as described in other sections. It is understood that any number of printed circuits 200N may be formed on and extracted from any number of tapes 500N and subsequently combined with the contact plates 100 as described.

Figure 12:
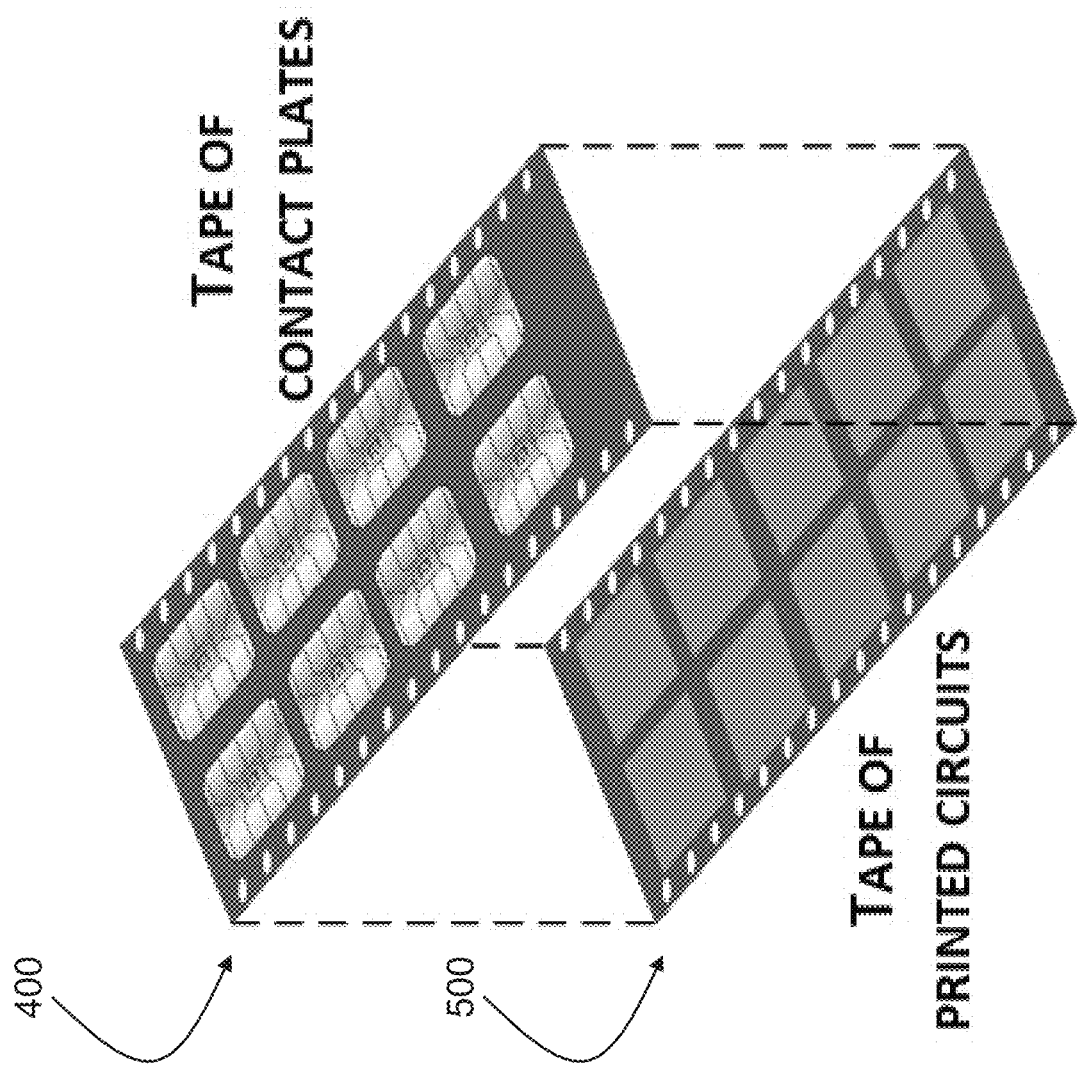
FIGS. 12-13 show aspects of a packaged electronic module according to exemplary embodiments hereof.
Figure 13:
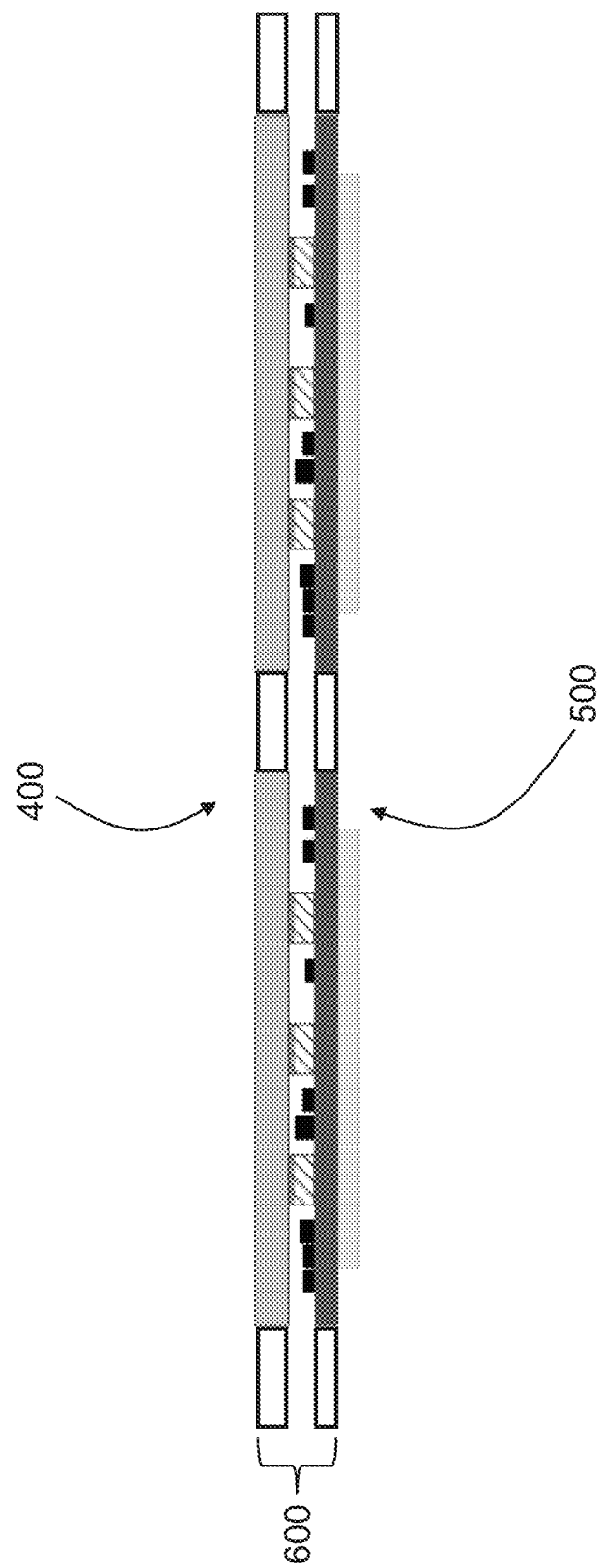

In one exemplary embodiment hereof as shown in FIGS. 12 and 13, the tape 400 of contact plates 100 is aligned and electrically mated with the tape 500 of printed circuits 200 to form the combined tape 600 of packaged electronic modules 300. This may be referred to as assembling the components 100, 200 roll-to-roll.

In one exemplary embodiment hereof, the details described in other sections with regards to the mating of an individual contact plate 100 with an individual printed circuit 200 (whether a single printed circuit 200 or a printed circuit 200 comprising two or more printed circuits 200N) to form an individual packaged electronic module 300 also pertain to this embodiment with regards to the mating of a plurality of contact plates 100 (as part of a tape 400) with a plurality of printed circuits 200 (as part of a tape 500) to form a tape 600 of corresponding pluralities of packaged electronic modules 300.

It is also understood that while the example described above with reference to FIGS. 10-13 depict the combining of two tapes (tape 400 of contact plates 100 with tape 500 of printed circuits 200) to form a combined tape 600 of packaged electronic modules 300, any number of tapes may be combined to form a combined tape of packaged electronic modules 300. For example, a tape 400 of contact plates 100 may be combined with a first printed circuit tape 500-1 and a second printed circuit tape 500-2 to form a combined tape 600 of packaged electronic modules 300. It is understood that a tape 400 of contact plates 100 may be combined with any number of printed circuit tapes 500-N to form a tape 600 of packaged electronic modules 300.

In one exemplary embodiment hereof, the resulting tape 600 of packaged electronic modules 300 may be diced to extract each individual packaged electronic module 300 from the tape 600. In some embodiments, the tapes 400, 500 and 600 may each include weakened die cut lines defining the perimeter of the packaged electronic modules 300 that may facilitate breaking of the combined tape 600 along the weakened die cut lines to extract each module 300. In other embodiments, a die cut tool or any other type of tool or process may be used to extract the individual packaged electronic modules 300 from the tape 600.

In one exemplary embodiment hereof, the tapes 400 and 500 include industry standard 35 mm width tape. However, it is understood that any type of tapes 400, 500 of any widths may be used.

Etched Contact Plate

In one exemplary embodiment hereof, the contact plate 100 is etched onto one surface of the printed circuit 200. In one embodiment, the etching of the contact plate 100 onto the printed circuit 200 may be performed during the manufacturing process of the printed circuit 200.

Figure 14:
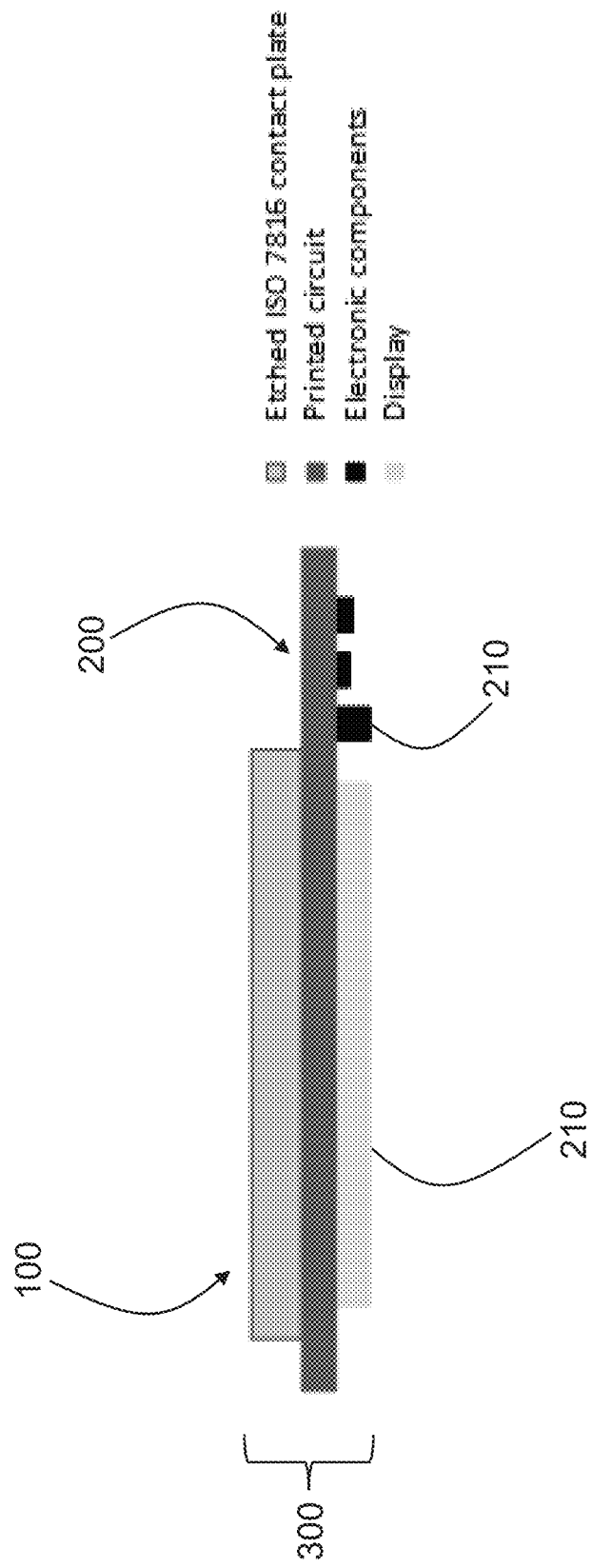
FIG. 14 shows aspects of an etched contact plate configured with a packaged electronic module according to exemplary embodiments hereof.

In one embodiment, a mask may be applied to the circuit laminate to protect the copper (or other metal) in the area of the desired contact plate. Then, during the etching process, the mask may generally facilitate the formation of the contact plate. Once the contact plate is formed, the mask may be removed. The resulting contact plate 100 etched onto the (upper) surface of the printed circuit 200 is shown in FIG. 14. Note that the contact plate 100 also may be etched into the lower surface of the printed circuit 200, and onto any surface of any circuit board 200N.

Additional Information

In any of the embodiments herein, the printed circuit 200 may include any type of substrate, including but not limited to, PI (polyimide), FR-4 (fiberglass), any other type of substrate and any combination thereof.

In any of the embodiments herein, the attachment and/or connection of the electronical connectors 106 to the electrical connectors 206 may include using SMT, ACF, soldering, wire bonding, any other applicable technology and any combination thereof.

In any of the embodiments herein, the attachment and/or connection of the electrical connectors 106 and/or the electrical connectors 206 to the corresponding areas 207 adapted to receive the electrical connectors 106, 206 on the printed circuit may include using SMT, ACF, soldering, wire bonding, any other applicable technology and any combination thereof.

In any of the embodiments herein, the attachment and/or connection of the electronic components 208 to the printed circuits 200, 200A, 200B, . . . 200N may include using SMT, ACF, soldering, wire bonding, any other applicable technology and any combination thereof.

In any of the embodiments herein, the physical footprint (size and shape) of the printed circuit 200 may be smaller than, substantially the same as, larger than or in any proportion to that of the contact plate 100.

In any of the embodiments herein, the contact plate 100 may include a 6-pin design, an 8-pin and/or any other number of pin (n-pin) design.

In any of the embodiments herein, the value-add component 210 of the resulting packaged electronic module 300 may be on the same side of the packaged electronic module 300 as the contact plate 100, on the opposite side of the packaged electronic module 300 as the contact plate 100, or on any other side of the package electronic module 300.

In any of the embodiments herein, the printed circuit 200, 200A, 200B, . . . 200N may include an antenna and/or electronic connectors in electrical communication with an antenna embedded in the smart card body.

It is understood that any details, components, elements and/or aspects described with respect to any one of embodiments herein may also apply to any other of the embodiments described herein.

Those of ordinary skill in the art will appreciate and understand, upon reading this description, that embodiments hereof may provide different and/or other advantages, and that not all embodiments or implementations need have all advantages.

Where a process is described herein, those of ordinary skill in the art will appreciate that the process may operate without any user intervention. In another embodiment, the process includes some human intervention (e.g., a step is performed by or with the assistance of a human).

As used herein, including in the claims, the phrase "at least some" means "one or more," and includes the case of only one. Thus, e.g., the phrase "at least some ABCs" means "one or more ABCs", and includes the case of only one ABC.

As used herein, including in the claims, term "at least one" should be understood as meaning "one or more", and therefore includes both embodiments that include one or multiple components. Furthermore, dependent claims that refer to independent claims that describe features with "at least one" have the same meaning, both when the feature is referred to as "the" and "the at least one".

As used in this description, the term "portion" means some or all. So, for example, "A portion of X" may include some of "X" or all of "X". In the context of a conversation, the term "portion" means some or all of the conversation.

As used herein, including in the claims, the phrase "using" means "using at least," and is not exclusive. Thus, e.g., the phrase "using X" means "using at least X." Unless specifically stated by use of the word "only", the phrase "using X" does not mean "using only X."

As used herein, including in the claims, the phrase "based on" means "based in part on" or "based, at least in part, on," and is not exclusive. Thus, e.g., the phrase "based on factor X" means "based in part on factor X" or "based, at least in part, on factor X." Unless specifically stated by use of the word "only", the phrase "based on X" does not mean "based only on X."

In general, as used herein, including in the claims, unless the word "only" is specifically used in a phrase, it should not be read into that phrase.

As used herein, including in the claims, the phrase "distinct" means "at least partially distinct." Unless specifically stated, distinct does not mean fully distinct. Thus, e.g., the phrase, "X is distinct from Y" means that "X is at least partially distinct from Y," and does not mean that "X is fully distinct from Y." Thus, as used herein, including in the claims, the phrase "X is distinct from Y" means that X differs from Y in at least some way.

It should be appreciated that the words "first," "second," and so on, in the description and claims, are used to distinguish or identify, and not to show a serial or numerical limitation. Similarly, letter labels (e.g., "(A)", "(B)", "(C)", and so on, or "(a)", "(b)", and so on) and/or numbers (e.g., "(i)", "(ii)", and so on) are used to assist in readability and to help distinguish and/or identify, and are not intended to be otherwise limiting or to impose or imply any serial or numerical limitations or orderings. Similarly, words such as "particular," "specific," "certain," and "given," in the description and claims, if used, are to distinguish or identify, and are not intended to be otherwise limiting.

As used herein, including in the claims, the terms "multiple" and "plurality" mean "two or more," and include the case of "two." Thus, e.g., the phrase "multiple ABCs," means "two or more ABCs," and includes "two ABCs." Similarly, e.g., the phrase "multiple PQRs," means "two or more PQRs," and includes "two PQRs."

The present invention also covers the exact terms, features, values and ranges, etc. in case these terms, features, values and ranges etc. are used in conjunction with terms such as about, around, generally, substantially, essentially, at least etc. (i.e., "about 3" or "approximately 3" shall also cover exactly 3 or "substantially constant" shall also cover exactly constant).

As used herein, including in the claims, singular forms of terms are to be construed as also including the plural form and vice versa, unless the context indicates otherwise. Thus, it should be noted that as used herein, the singular forms "a," "an," and "the" include plural references unless the context clearly dictates otherwise.

Throughout the description and claims, the terms "comprise", "including", "having", and "contain" and their variations should be understood as meaning "including but not limited to", and are not intended to exclude other components unless specifically so stated.

It will be appreciated that variations to the embodiments of the invention can be made while still falling within the scope of the invention. Alternative features serving the same, equivalent or similar purpose can replace features disclosed in the specification, unless stated otherwise. Thus, unless stated otherwise, each feature disclosed represents one example of a generic series of equivalent or similar features.

The present invention also covers the exact terms, features, values and ranges, etc. in case these terms, features, values and ranges etc. are used in conjunction with terms such as about, around, generally, substantially, essentially, at least etc. (i.e., "about 3" shall also cover exactly 3 or "substantially constant" shall also cover exactly constant).

Use of exemplary language, such as "for instance", "such as", "for example" ("e.g.,") and the like, is merely intended to better illustrate the invention and does not indicate a limitation on the scope of the invention unless specifically so claimed.

While the invention has been described in connection with what is presently considered to be the most practical and preferred embodiments, it is to be understood that the invention is not to be limited to the disclosed embodiment, but on the contrary, is intended to cover various modifications and equivalent arrangements included within the spirit and scope of the appended claims.

What is claimed is:

1. A method of assembling a packaged electronic module for use with a smart card, the method comprising the steps:
   (A) providing a first contact plate including a first electrical connector configured with a first surface of the first contact plate;
   (B) providing a first printed circuit including a second electrical connector and one or more electronic components configured with a first surface of the first printed circuit;
   (C) electrically and physically mating the first electrical connector with the second electrical connector to form a packaged electronic module;
   wherein the electrical and physical mating of the first electrical connector with the second electrical connector in (C) forms a gap between the first surface of the first contact plate and the first surface of the first printed circuit, and wherein at least one of the one or more electronic components configured with the first surface of the first printed circuit fits within the gap.

2. The method of claim 1 wherein the first surface of the first contact plate includes the bottom of the first contact plate and the first surface of the first printed circuit includes the top of the first printed circuit.

3. The method of claim 1 wherein the first contact plate includes one or more contact points and the first electrical connector of the first contact plate is electrically connected to at least one of the one or more contact points.

4. The method of claim 1 wherein the first printed circuit includes one or more value add components selected from the group: a display, a fingerprint sensor and an LED device.

5. The method of claim 1 wherein the first contact plate and/or the first printed circuit is configured with an antenna.

6. The method of claim 1 wherein the first contact plate is included in a first contact plate tape.

7. The method of claim 1 wherein the first printed circuit is included in a first printed circuit tape.

8. A method of assembling a packaged electronic module for use with a smart card, the method comprising the steps:
   (A) providing a first contact plate including a first electrical connector, the first electrical connector configured with a first surface of the first contact plate;
   (B) providing a first printed circuit including a second electrical connector configured with a first surface of the first printed circuit, and a third electrical connector configured with a second surface of the printed circuit;
   (C) providing a second printed circuit including a first contact area configured with a first surface of the second printed circuit;
   (D) electrically mating the first electrical connector with the second electrical connector and the third electrical connector with the first contact area to form a packaged electronic module.

9. The method of claim 8 wherein the first surface of the first contact plate includes the bottom of the first contact plate, the first surface of the first printed circuit includes the top of the first printed circuit, the second surface of the first printed circuit includes the bottom of the first printed circuit, and the first surface of the second printed circuit includes the top of the second printed circuit.

10. The method of claim 8 wherein the second electrical connector is electrically connected to the third electrical connector.

11. The method of claim 8 wherein the first printed circuit includes one or more first electronic components and the first electrical connector of the first printed circuit is electrically connected to at least one of the one or more first electronic components.

12. The method of claim 8 wherein the first contact plate and/or the first printed circuit and/or the second printed circuit is configured with an antenna.

13. The method of claim 11 wherein the electrical mating of the first electrical connector with the second electrical connector in (D) forms a first gap between the first surface of the first contact plate and the first surface of the first printed circuit, and wherein at least one of the one or more first electronic components fits within the first gap.

14. The method of claim 8 wherein the second printed circuit includes one or more second electronic components and the first contact area of the second printed circuit is electrically connected to at least one of the one or more second electronic components.

15. The method of claim 14 wherein the electrical mating of the third electrical connector with the first contact area in (D) forms a second gap between the second surface of the first printed circuit and the first surface of the second printed circuit, and wherein at least one of the one or more second electronic components fits within the second gap.

16. The method of claim 8 wherein the second printed circuit includes one or more value add components selected from the group: a display, a fingerprint sensor and an LED device.

17. The method of claim 8 wherein the first contact area includes a fourth electrical connector.

18. The method of claim 8 wherein the first contact plate is included in a first contact plate tape.

19. The method of claim 8 wherein the first printed circuit is included in a first printed circuit tape.

20. The method of claim 8 wherein the second printed circuit is included in a first printed circuit tape.

* * * * *